(12) United States Patent
Lin et al.

(10) Patent No.: US 8,330,886 B2
(45) Date of Patent: Dec. 11, 2012

(54) THIN FILM TRANSISTOR ARRAY SUBSTRATE AND REPAIR METHOD THEREOF

(75) Inventors: Kuang-Hsiang Lin, Padeh (TW); Huei-Chung Yu, Padeh (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 413 days.

(21) Appl. No.: 11/646,507

(22) Filed: Dec. 28, 2006

(65) Prior Publication Data

US 2008/0088761 A1 Apr. 17, 2008

(30) Foreign Application Priority Data

Oct. 11, 2006 (TW) ................................ 95137357 A

(51) Int. Cl.
*G02F 1/136* (2006.01)
(52) U.S. Cl. ............................................ 349/43; 349/46
(58) Field of Classification Search ............... 349/42–48
See application file for complete search history.

(56) References Cited

U.S. PATENT DOCUMENTS

| | | | |
|---|---|---|---|
| 6,900,871 B1 * | 5/2005 | Song et al. ..................... | 349/139 |
| 7,333,171 B2 * | 2/2008 | Kim et al. ...................... | 349/144 |
| 2002/0176030 A1 * | 11/2002 | Matsumoto ..................... | 349/43 |
| 2002/0180926 A1 * | 12/2002 | Mizumura et al. ............. | 349/192 |
| 2004/0070713 A1 * | 4/2004 | Song ............................... | 349/129 |
| 2005/0017937 A1 * | 1/2005 | Chen et al. ....................... | 345/87 |
| 2005/0173707 A1 * | 8/2005 | Shiraki et al. ................... | 257/72 |
| 2005/0231666 A1 * | 10/2005 | Kim et al. ....................... | 349/114 |

FOREIGN PATENT DOCUMENTS

| JP | 4016930 | 1/1992 |
|---|---|---|
| JP | 2002-350900 | 12/2002 |

* cited by examiner

*Primary Examiner* — Jerry Blevins

(74) *Attorney, Agent, or Firm* — Jianq Chyun IP Office

(57) ABSTRACT

A thin film transistor array substrate includes a plurality of pixel areas defined by scan lines and data lines; a pixel electrode disposed on each of pixel areas; and a thin film transistor disposed on the each scan lines includes a gate electrode; a source electrode; a first drain electrode and a second drain electrode disposed along the source electrode and on the opposite sides; and an insulating layer over the source electrode, the first drain electrode, the second drain electrode and data lines. The insulating layer has a contact hole to electrically connect with the pixel electrode and the first drain electrode; and the second drain electrode extends to a portion adjacent the pixel electrode and electrically insulated with each other by the insulating layer. The present repair method is to irradiate a laser beam to short the second drain electrode and the pixel electrode at the adjacent pixel area.

10 Claims, 5 Drawing Sheets

THIN FILM TRANSISTOR ARRAY SUBSTRATE AND REPAIR METHOD THEREOF

BACKGROUND OF THE INVENTION

1. Field of the Invention

The present invention generally relates to a liquid crystal display device, and more particularly relates to a thin film transistor array substrate and repair method thereof for a liquid crystal display device.

2. Description of the Prior Art

Currently, the thin film transistor liquid crystal display (TFT LCD) is the most popular plane display device. It has many advantages such as its low consumption, thin and compact shape, and low driving voltage, etc. Generally, a TFT LCD panel has a liquid crystal layer sandwiched by two substrates with electrodes thereof. Applying voltages to respect electrodes can control the light transmittance of the liquid crystal. The display region of a TFT panel is composed of a plurality of matrix-like pixels.

During the procedures of fabricating the TFT panel, the pixel is liable to be damaged and resulted in an abnormal short-circuit or open-circuit by several factors such as the static electricity and the unexpected particle pollution. The pixel defects can be distinguished as several kinds such as the white defect, the black defect, and the gray defect, etc.

FIG. 1 illustrates a partial plan view of the pixel structure for the liquid crystal display device according to the prior art. Referring to FIG. 1, the pixel structure is arranged a first metal layer 130 floating under a second metal layer 120 that is connected with a conductive pixel electrode 110. The second metal layer 120 is overlapped with the data line 140 and electrically insulated with each other. While the TFT is non-acting, the repair method is to irradiate the laser beam to electrically short at two laser repair regions "A". However, this pixel structure requires an extra floating metal so as to cause decreasing the aperture ratio of the pixel. Further, because the voltage level is not constant, the voltage signal on the data line will influence the voltage of the pixel so as to cause the poor display quality. Besides, because of the accumulation of electrostatic charges, the overlapping region of the first metal layer and the second metal layer is easily damaged because of the electrostatic accumulation and the short between different metal in the same layer so as to increase the defective rate. This kind of laser repair structure needs to irradiate two laser beams to achieve the pixel repair. After repairing, the pixel is only presented the gray defect because of the average voltage of data line, so the gray defect can be found out under the black screen of the panel.

The laser repair structure above-mentioned needs to irradiate two laser beams. It is complicated and needs more repair time and cost. Hence, how to overcome the mentioned problem is important for enhancing the product yield and cost of the LCD device.

SUMMARY OF THE INVENTION

In order to solve the mentioned problem, one object of the present invention provides a thin film transistor array substrate and repair method thereof for the liquid crystal display device, which utilizes the TFT of the previous pixel as the signal source so as to obtain the regular display signal for the non-acting pixel to achieve the repair for the pixel defect.

In order to solve the white defect or the dark defect causing from the non-action TFT, one object of the present invention provides a thin film transistor array substrate and repair method thereof for the liquid crystal display device. The design of the pixel structure of the thin film transistor array substrate can repair the pixel to have the pixel display ability with the gray level as well as the regular pixel.

One object of the present invention provides a thin film transistor array substrate and repair method thereof for liquid crystal display device. The pixel repair design is arranged with the black matrix region above the pixel so as not to decrease the aperture ratio.

One object of the present invention provides a thin film transistor array substrate and repair method thereof for liquid crystal display device. This pixel structure of the thin film transistor array substrate only needs to irradiate one laser beam to complete the repair. The brightness of the repaired pixel is not displaying the gray defect but as same as the previous regular pixel, wherein the repaired pixel is not easy to be found out. The pixel structure can substantially reduce the repair time and enhance the yield of the product.

Accordingly, one embodiment of the present invention provides a thin film transistor array substrate includes: a plurality of pixel areas defined by a plurality of scan lines and a plurality of data lines on a substrate; a pixel electrode disposed on each of pixel areas; and a thin film transistor disposed on the each scan lines inside the each pixel areas. Wherein the thin film transistor comprises: a gate electrode as a portion of the each scan lines; a source electrode over the gate electrode, electrically connected to the each data lines; a first drain electrode and a second drain electrode disposed along the source electrode and on the opposite sides of the source electrode; and an insulating layer over the source electrode, the first drain electrode, the second drain electrode and data lines. Wherein the insulating layer has a contact hole to electrically connect with the pixel electrode and the first drain electrode; and the second drain electrode extends to a portion adjacent the pixel electrode and electrically insulated with each other by the insulating layer.

Another embodiment of the present invention provides a pixel repair method of a pixel structure of the thin film transistor array substrate according to the forgoing embodiment includes the step of irradiating a laser beam to short the second drain electrode and the pixel electrode at adjacent the pixel areas.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
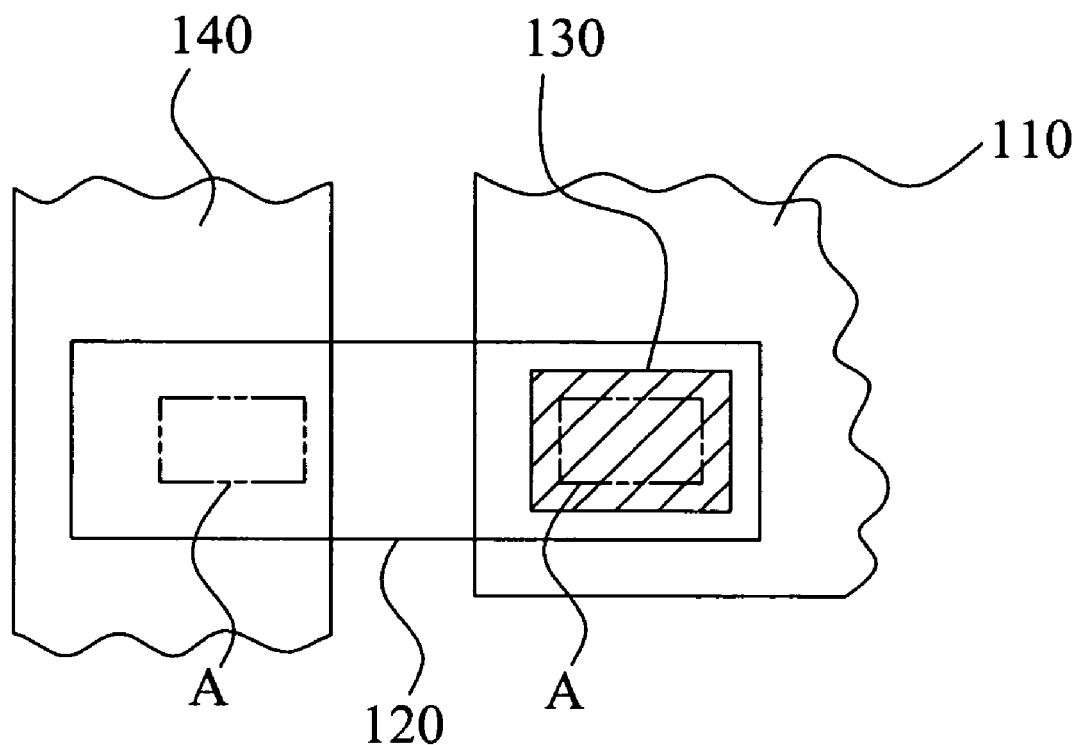
FIG. 1 is a partial plan view of the pixel structure for the liquid crystal display device according to the prior art.
Figure 2:
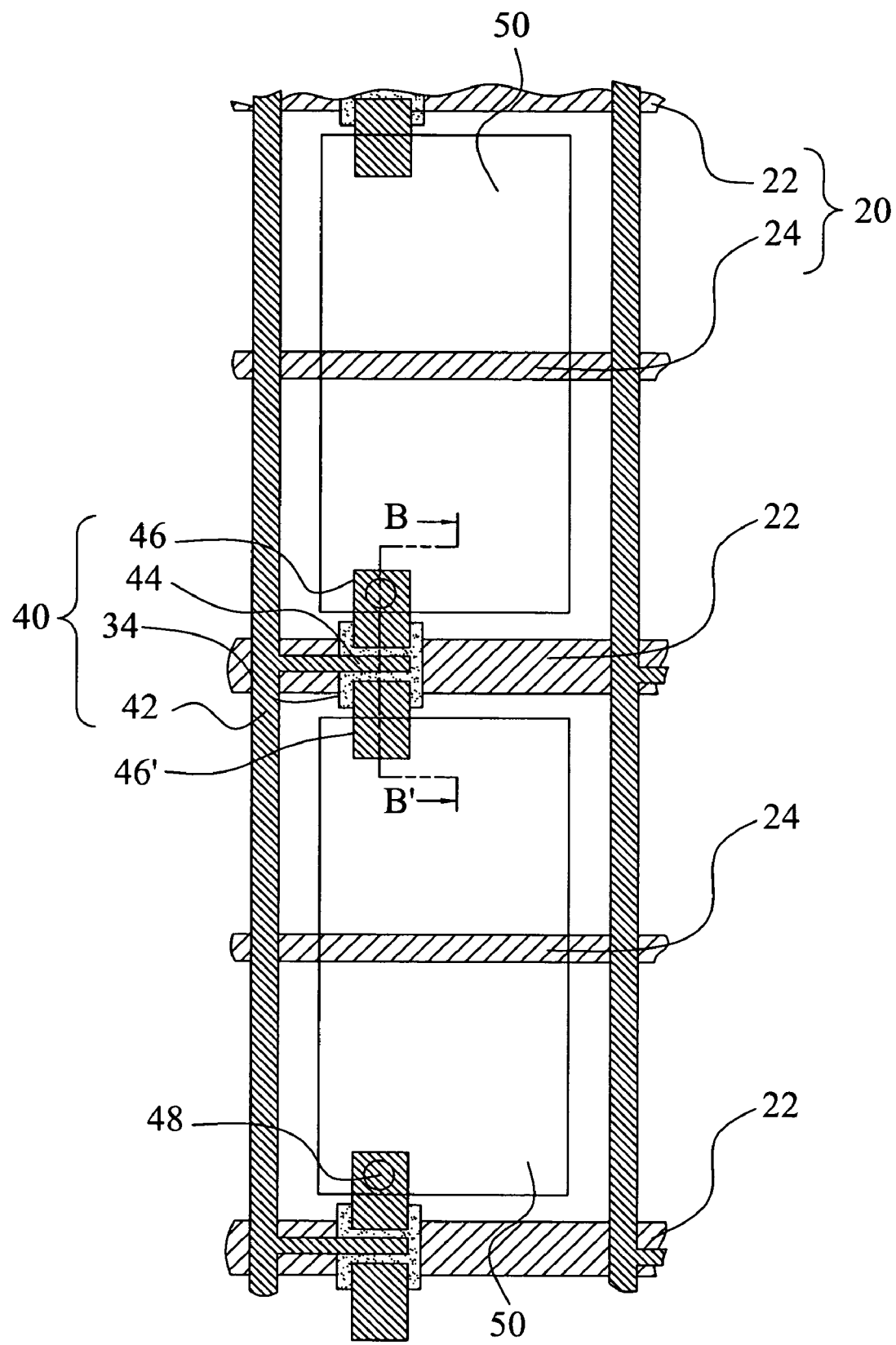
FIG. 2 is the plan view of the pixel structure according to one embodiment of the present invention.

FIG. 2 is a plan view of the pixel structure illustrating one embodiment of the present invention. Such as shown in FIG.

2, in the present embodiment, a plurality of scan lines 22 and a plurality of data lines 42 are disposed on a substrate (not shown in FIG. 2). Scan lines 22 and data lines 42 cross each other to define a plurality of pixel areas. There are a plurality of storage capacitance lines 24 are disposed extend over pixel areas along scan lines 22 and to cross data lines 42. A plurality of pixel electrodes 50 are respectively disposed on each of pixel areas and a plurality of thin film transistors 40 are respectively disposed on the each scan lines 22 inside the each pixel areas. Wherein, any one of thin film transistors includes a gate electrode (not shown in FIG. 2); a source electrode 44; a first drain electrode 46; and a second drain electrode 46'. The gate electrode is as a portion of the each scan lines 22, the source electrode 44 is over the gate electrode and electrically connecting to the each data lines 42, and the first drain electrode 46 is electrically connected to the pixel electrode 50. Wherein, the first drain electrode 46 and the second drain electrode 46' are disposed along the source electrode 44 and on the opposite sides of the source electrode 44; and a portion of the second drain electrode 46' is overlapping on the pixel electrode 50 at adjacent pixel area and electrically insulating with each other by an insulation layer (not shown in FIG. 2). The insulation layer is over the source electrode 44, the first drain electrode 46, the second drain electrode 46', and data lines 42. Wherein the insulating layer has a contact hole 48 to electrically connect with the pixel electrode 50 and the first drain electrode 46; and the second drain electrode 46' extends to a portion adjacent the pixel electrode 50 and is electrically insulating with each other by the insulating layer.

Following the foregoing, in the present embodiment, a gate insulation layer (not shown in FIG. 2) is disposed to cover the gate electrode. The thin film transistor 40 further includes an semiconductor layer 34 disposed between the gate insulation layer and the source electrode 44, the first drain electrode 46 and the second drain electrode 46'. The first drain electrode 46 is electrically connected to the pixel electrode 50 via a contact hole 48 on the insulation layer. The second drain electrode 46' and the pixel electrode 50 are electrically insulating with each other by the insulation layer.

In the mentioned above, the material of scan lines 22, data lines 42, storage capacitance lines 24, the gate electrode, the source electrode 44, the first drain electrode 46, and the second drain electrode 46' comprises materials selected from the group consisting of aluminum (Al), copper Cu), gold (Au), chromium (Cr), tantalum (Ta), titanium (Ti), manganese (Mn), nickel (Ni), silver (Ag), or combination thereof. The material of the pixel electrodes 50 comprises indium tin oxide (ITO) or indium zinc oxide (IZO). The material of the gate insulation layer and the insulation layer comprises silicon oxide or silicon nitride. In the present embodiment, scan lines 22 and storage capacitance lines 24 are formed by a first metal layer 20; and data lines 42, the source electrode 44, the first drain electrode 46 and the second drain electrode 46' are formed by a second metal layer 40. The material of the first metal layer 20 and the second metal layer 20 comprises materials selected from the group consisting of Al, Cu, Au, Cr, Ta, Ti, Mn, Ni, Ag, or combination thereof.

Such as shown in FIG. 2, in the present embodiment, while the thin film transistor of the pixel area is non-acting, the laser beam is utilized to electrically short the second drain electrode 46' and the pixel electrode 50 upper the pixel area. Then, the second drain electrode 46' and the source electrode 44 will form a backup thin film transistor. The display signal can transmit via the backup thin film transistor to the non-action pixel and the display signal simultaneously controls two pixels.

Figure 3:
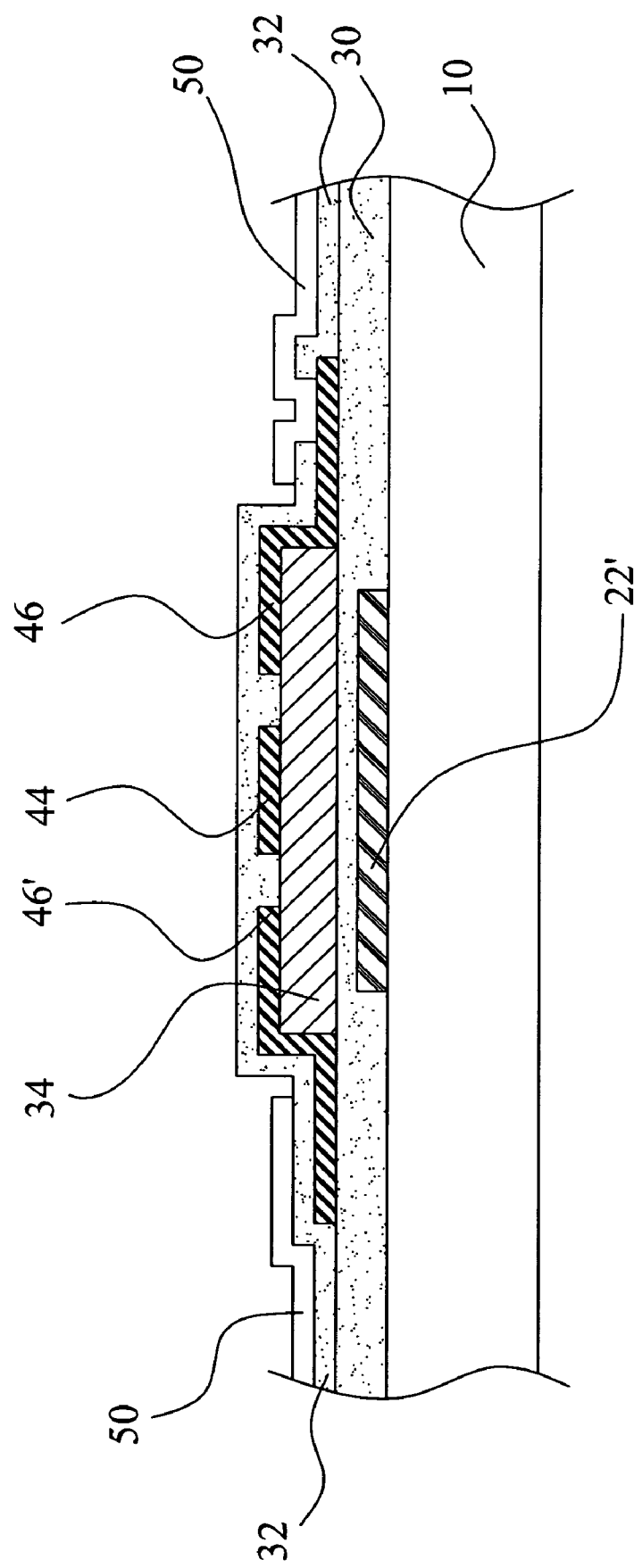
FIG. 3 is the sectional view of the thin film transistor of B-B' cross-sections of FIG. 2 according to one embodiment of the present invention.

FIG. 3 is the sectional view of the thin film transistor of B-B' cross-sections of FIG. 2 illustrating one embodiment of the present invention. In the present embodiment, a gate electrode 22' is disposed on a substrate 10 and the gate electrode 22' is within the scan line. The material of the substrate 10 comprises transparent glass. A gate insulation layer 30 is covering on the gate electrode 22' and the substrate 10. A semiconductor layer 34 is disposed on the gate insulation layer 30 on the gate electrode 22' and a source electrode 44, a first drain electrode 46 and a second drain electrode 46' are disposed on the semiconductor layer 34. Wherein, the second drain electrode 46' is disposed symmetrically to the first drain electrode 46. An insulation layer 32 is disposed to cover the source electrode 44, the first drain electrode 46 and the second drain electrode 46'. A pixel electrode 50 of a pixel area is partially overlapping with the first drain electrode 46. The first drain electrode 46 is electrically connecting to the pixel electrode 50 via a contact hole 48 on the insulation layer 32; and a portion of the second drain electrode 46' is also overlapping on the pixel electrode 50 at adjacent pixel area and utilizes the insulation layer 32 to electrically insulate with each other.

Figure 4:
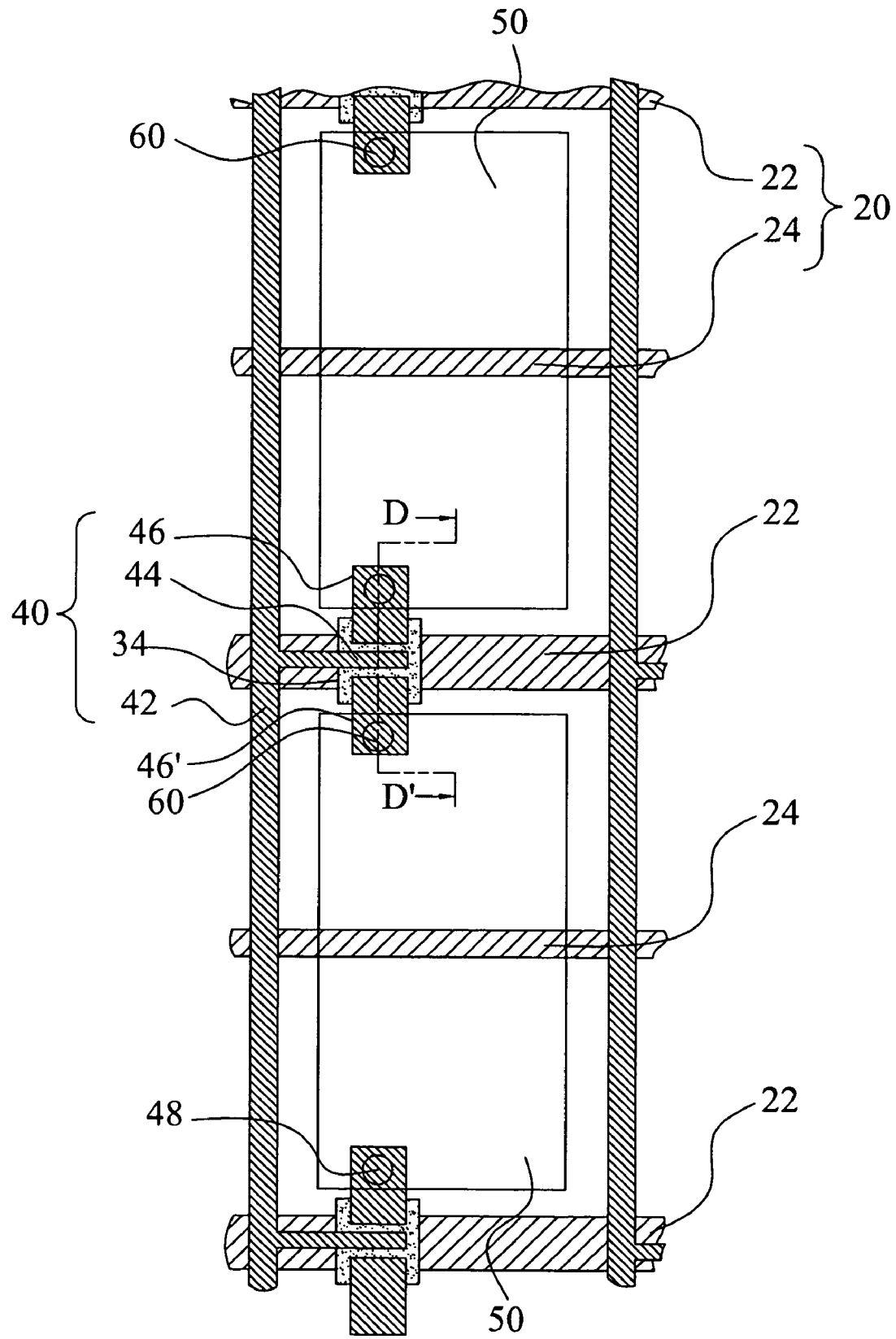
FIG. 4 is the plan view of the repair method of the pixel structure according to one embodiment of the present invention.
Figure 5:
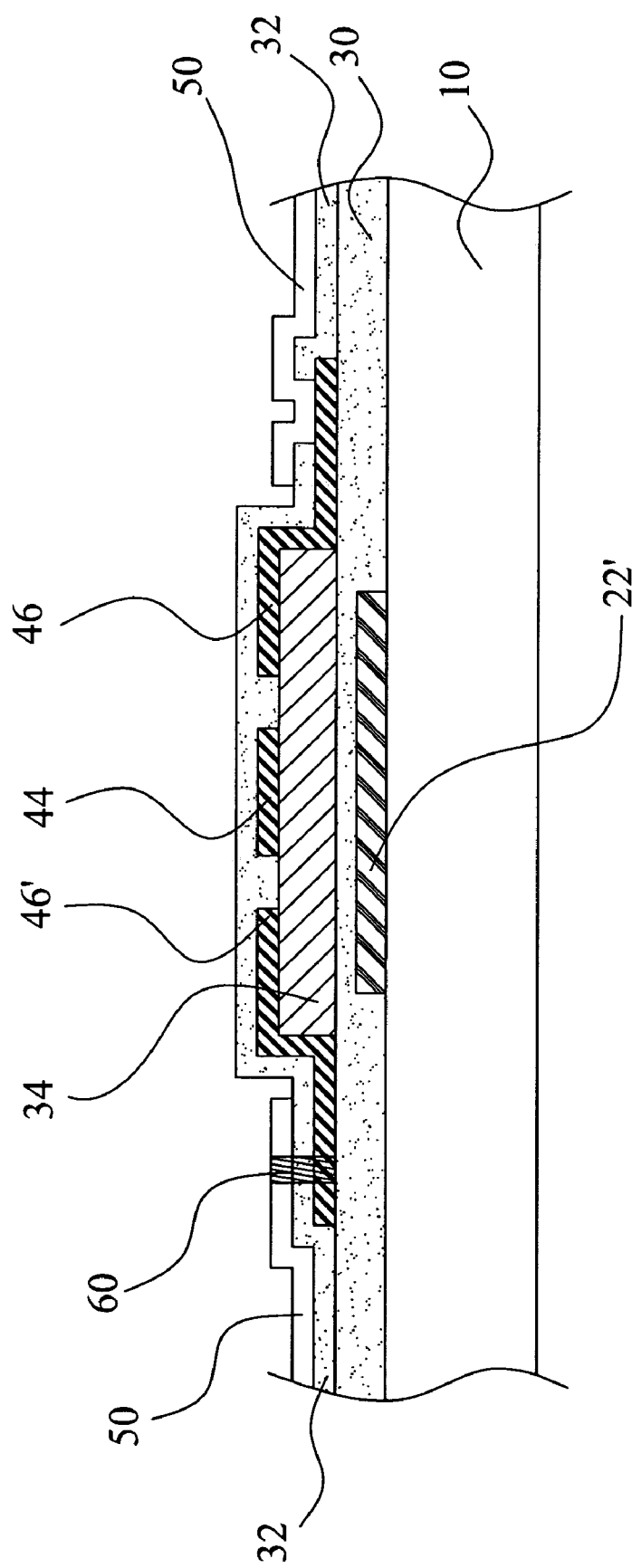
FIG. 5 is the sectional view of the thin film transistor of D-D' cross-sections of FIG. 4 according to one embodiment of the present invention.

Referring to FIG. 4 and FIG. 5, while performing the repairing of the pixel structure, the laser beam is irradiating to electrically short the second drain electrode 46' and the pixel electrode 50 at the overlap region 60 so as the second drain electrode 46' and the source electrode 44 will form a backup thin film transistor.

Accordingly, one of features of the present invention is to utilize the second drain electrode. Even the second drain electrode is floating disposed and overlapping with the gate electrode, the second drain electrode always maintains at the fixed-voltage without the voltage level problem because there is only a voltage variation of the gate electrode as the pixel switching on. Besides, even the electrostatic damage or the short problem happening on the second drain electrode, because the second drain electrode is electrically insulating with the pixel electrode before pixel repairing, so it does not cause the pixel defect.

To sum up the forgoing, the present invention utilizes the TFT of the previous pixel as the signal source so as to obtain the display signal as regular for the non-acting pixel to achieve the repair for the pixel defect. The design of the pixel structure can repair the pixel to have the pixel display ability with the gray level as well as the regular pixel. Further, the pixel repair design is disposed with the black matrix region above the pixel so as not to decrease the aperture ratio. The brightness of the repaired pixel is not displaying the gray defect but as same as the previous regular pixel, wherein the repaired pixel is not easy to be found out. The pixel structure can substantially reduce the repair time and enhance the yield of the product.

While the present invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:
1. A thin film transistor array substrate, comprising:
a plurality of scan lines and a plurality of data lines disposed on a substrate to define a plurality of pixel areas;
a plurality of pixel electrodes, each of the pixel areas being disposed with one of the pixel electrodes;

a plurality of thin film transistors, each of the thin film transistor being disposed on one of the scan lines and each of the thin film transistors comprising a gate electrode being a portion of the one of the scan lines;

a source electrode disposed over the gate electrode and electrically connected to one of the data lines;

a first drain electrode disposed over the gate electrode corresponding to the source electrode and partially overlapping with one of the pixel electrodes located at a first side of the one of the scan lines, wherein a portion of the first drain electrode is contacted to the pixel electrode located at the first side through a contact hole;

a second drain electrode disposed over the same gate electrode corresponding to the same source electrode and partially overlapping with and not contacted to another one of the pixel electrodes located at a second side of the one of the scan lines, wherein the first side and the second side are located at two opposite sides across the one of the scan lines; and an insulation layer disposed on the substrate and covering the thin film transistor, wherein the insulation layer has a contact hole and the first drain electrode is electrically connected to the one of the pixel electrodes located at the first side of the one of the scan lines through the contact hole; and the second drain electrode is electrically insulated with the pixel electrodes and the data lines by the insulation layer before repairing.

2. The thin film transistor array substrate according to claim 1, further comprising a gate insulation layer disposed over said gate electrode.

3. The thin film transistor array substrate according to claim 2, wherein said thin film transistor further comprises a semiconductor layer between said gate insulation layer on said gate electrode and said source electrode, said first drain electrode and said second drain electrode.

4. The thin film transistor array substrate according to claim 2, wherein the material of said gate insulation layer comprises silicon oxide or silicon nitride.

5. The thin film transistor array substrate according to claim 1, wherein the material of said insulation layer comprises silicon oxide or silicon nitride.

6. The thin film transistor array substrate according to claim 1, wherein the material of said substrate comprises glass.

7. The thin film transistor array substrate according to claim 1, further comprising a plurality of storage capacitance lines disposed extend over said pixel areas along said scan lines to cross said data lines.

8. The thin film transistor array substrate according to claim 7, wherein the material of said scan line, said data line, said storage capacitance line, said gate electrode, said source electrode, said first drain electrode, and said second drain electrode comprises materials selected from the group consisting of aluminum, copper, gold, chromium, tantalum, titanium, manganese, nickel, silver, or combination thereof.

9. The thin film transistor array substrate according to claim 1, wherein the material of said pixel electrode comprises indium tin oxide or indium zinc oxide.

10. A repair method of a pixel structure of the thin film transistor array substrate according to claim 1, comprising the step of irradiating a laser beam to short said second drain electrode and said pixel electrode at adjacent said pixel areas.

* * * * *